(12) United States Patent
Aggarwal et al.

(10) Patent No.: US 7,886,227 B2
(45) Date of Patent: Feb. 8, 2011

(54) CROSS-ENVIRONMENT CONTEXT-SENSITIVE HELP FILES

(75) Inventors: Radhika Aggarwal, Raleigh, NC (US); Thomas Jay Allen, Rochester, MN (US); Brian J. Cragun, Rochester, MN (US); William H. Krebs, Jr., Cary, NC (US); Clifton M. Nock, Highlands Ranch, CO (US); Elizabeth A. Schreiber, Apex, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2133 days.

(21) Appl. No.: 10/041,182

(22) Filed: Jan. 3, 2002

(65) Prior Publication Data

US 2003/0122859 A1 Jul. 3, 2003

(51) Int. Cl.
*G06F 3/00* (2006.01)
(52) U.S. Cl. ...................................... 715/705; 715/714
(58) Field of Classification Search ................. 715/784, 715/707, 708, 733, 705, 714; 709/203, 218
See application file for complete search history.

(56) References Cited

U.S. PATENT DOCUMENTS

| 4,992,972 | A | | 2/1991 | Brooks et al. ................ 364/900 |
| 5,535,323 | A | * | 7/1996 | Miller et al. ................. 715/707 |
| 5,581,684 | A | | 12/1996 | Dudzik et al. ................ 395/338 |
| 5,933,139 | A | | 8/1999 | Feigner et al. ............... 345/338 |
| 6,133,917 | A | | 10/2000 | Feigner et al. ............... 345/338 |
| 6,230,287 | B1 | * | 5/2001 | Pinard et al. ................... 714/31 |
| 6,735,592 | B1 | * | 5/2004 | Neumann et al. ........... 707/101 |
| 2003/0001875 | A1 | * | 1/2003 | Black et al. ................. 345/708 |

OTHER PUBLICATIONS

"Web Browser Based Help For Java Applets", *IBM Technical Disclosure Bulletin*, pp. 527-528, vol. 41, No. 01, Jan. 1998.
"Improved Technique for Implementing Web Help", *IBM Technical Disclosure Bulletin*, p. 59, vol. 40, No. 10, Oct. 1997.
"HTML Tag Reference", <http://developer.netscape.com/docs/manuals/htmlguid/tags3.htm, Sep. 17, 2001.

* cited by examiner

*Primary Examiner*—Weilun Lo
*Assistant Examiner*—Truc T Chuong
(74) *Attorney, Agent, or Firm*—Scott D. Paul, Esq.; Carey, Rodriguez, Greenberg & Paul, LLP

(57) ABSTRACT

A method for providing context-sensitive help across variable environments. In each of the variable environments, the method can include tokenizing a received network request for help, the tokenization producing a contextually pertinent help file name and a base address of a corresponding help file. Subsequently, the corresponding help file can be located in a fixed storage location referenced by associating the help file name with the base address. Finally, the located help file can be encoded with the base address, and transmitting to a requesting client.

8 Claims, 3 Drawing Sheets

CROSS-ENVIRONMENT CONTEXT-SENSITIVE HELP FILES

BACKGROUND OF THE INVENTION

1. Statement of the Technical Field

The present invention relates to providing context sensitive help in a user interface and more particularly to providing cross-environment support for context-sensitive help files.

2. Description of the Related Art

Many computer programs include dedicated help facilities that provide end-users with on-screen information which relates to the operation of the computer program. In most cases, these dedicated help facilities are inseparably associated with the specific computer program. For many years, dedicated help facilities related to the operation of an associated computer program in a single context. Specifically, regardless of the state of operation of the computer program, an end-user's request for on-line help resulted in the presentation of the same help information, typically in the form of a help index. Providing help in a single context, however, compels the end-user to navigate one or more help indices in an attempt to locate a pertinent help file. Of course, in many cases it is not clear to an end-user how to locate the necessary help.

In response to the clear deficiencies of fixed context help, in recent years context-sensitive help has become available in many computer programs. In a help system which can provide context-sensitive help, the help system can detect the current state of a computer program when an end-user requests help. Upon such a help request, the help system can select a suitable help file or portion of a help file which relates specifically to the current state of the computer program. In this way, the help system can provide pertinent help on-demand, without first requiring the end-user to navigate a series of indices to locate a relevant help file.

Despite the clear advantages of providing context-sensitive help with conventional computer programs, heretofore these same advantages have not been fully realized in many types of network distributable applications. Examples of such network distributable applications include those applications implemented through the structured distribution of Web pages and other types of markup. In particular, Web pages can include not only static content, but also dynamic content in the case of "active" pages like Java Server Pages. Other such network distributable applications include Java applications.

As one skilled in the art will recognize, network-deployed applications ought to provide context-sensitive and panel-level help files for use in not only a single environment, but also across multiple environments, multiple languages and multiple, differing end-user skill levels. Among these multiple environments, the same help system might support not only an installed Java application, but also Web-served hypertext markup language (HTML) applications. Typically, help systems which support individual environments store context-sensitive help files in an archive which can be extracted upon demand in the particular environment. Yet, in other cases, the context-sensitive help files can be stored individually as other types of files in the file system of the individual environment.

In any event, the files and resources associated with an application's help system ought to be accessible to an end-user without always requiring the extraction of the pertinent help files from an archive. This particularly can be the case where such help files are stored in a file system during the development phase of a computer application, but are stored in an archive upon deploying the computer application. Accordingly, there has arisen a need for cross-environment context-sensitive help files which can function regardless of the environment in which a corresponding application has been deployed.

SUMMARY OF THE INVENTION

The present invention addresses the deficiencies of the prior art and provides for cross-environment context-sensitive help files which can function regardless of the environment in which a corresponding application has been deployed. In the help system of the invention, fixed storage can be provided which contains one of either a multiplicity of context-specific help files or a help file archive containing one or more context-specific help files. The help system also can include a base address and at least one help link, both embedded in markup in selected ones of network distributable documents.

The help link can specify a relative address of one of the context-specific help files. The base address, by comparison, can specify a base location in the fixed storage from which the relative address can be resolved. Finally, the help system can include a help servlet configured both to resolve a location of a selected help file from the base and relative addresses, and also to retrieve the selected help file at the resolved location from among either the context-specific files or the help file archive. Notably, the help system also can include a base path and servlet address, both embedded in the base address, wherein the help servlet can be accessed through the base path at the servlet address. Additionally, the help system also can include a document encoder configured to append the base address to selected ones of the help files.

Aside from the help system, the present invention also can include a method for providing context-sensitive help across variable environments. In each of the variable environments, the method can include tokenizing a received network request for help, the tokenization producing a contextually pertinent help file name and a base address of a corresponding help file. Subsequently, the corresponding help file can be located in a fixed storage location referenced by associating the help file name with the base address. Finally, the located help file can be encoded with the base address, and transmitting to a requesting client.

Importantly, in one aspect of the invention, the locating step can include the steps of providing the help file name and base address to a class loader in the variable environment. The class loader can search the fixed storage location for the corresponding help file. If the class loader locates the corresponding help file in a help file archive, the class loader can extract the corresponding help file from the archive. Finally, each help file in the fixed storage can be encoded with the base address.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a help system and method which can serve context-sensitive help files to requesting clients across multiple variable environments. Specifically, in the present invention, a help servlet can be created which, given a base path and help file name, can locate a help file either in a help file archive or from among a collection of help files in a file system. In this way, an end-user can access the files and resources associated with an application's help system both in the more complex case where the help system incorporates a help file archive, and in the simpler case where the help system incorporates merely a collection of help files in a file system. This particularly can be the case where such help files are stored in a file system during the development phase of a computer application, but are stored in an archive upon deploying the computer application.

Figure 1:
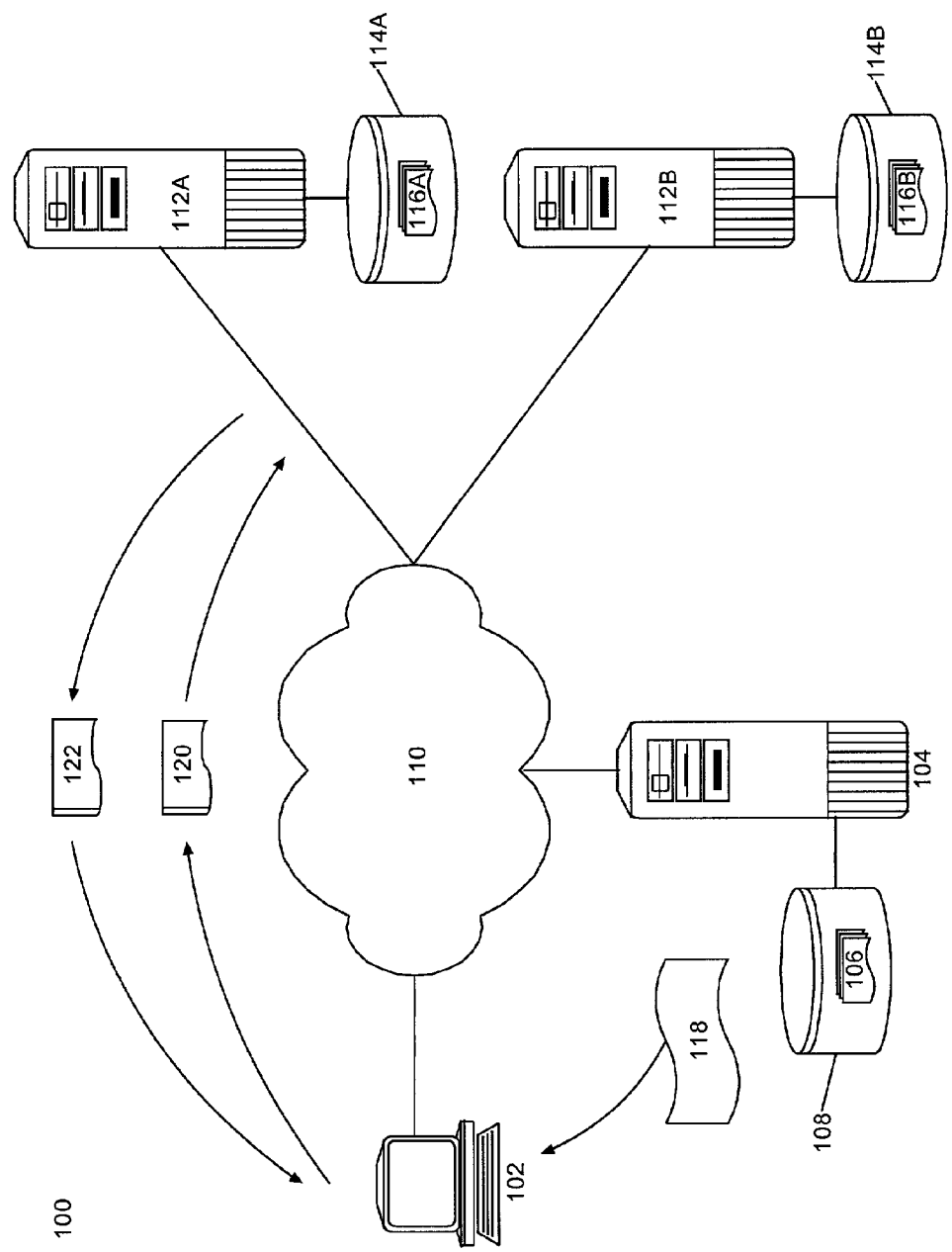
FIG. 1 is a block diagram illustrating a help system which has been configured in accordance with the inventive arrangements.

FIG. 1 is a block diagram illustrating a help system which has been configured in accordance with the inventive arrangements. The help system 100 can include one or more servers 112A, 112B contain a help servlet configured to process requests for contextual help. Each help servlet can provide on-line help for one or more applications 106 deployed in a server 104. End-users can use one or more client computers 102 to interact with the application 106 by communicating application requests over a computer communications network 110 such as the Internet. The server 104 can respond to such application requests by serving documents 118 to requesting clients 102.

As will be apparent to one skilled in the art, the application 106 can be a Web-based application, formed of multiple documents 118. Each document 118 can contain markup specifying the presentation of application-related content. Additionally, the markup can specify input means through which end-users can interact with the application. The server 104 can store the documents 118 forming the application 106 in fixed storage 108. In consequence, the server 104 can respond to particular end-user requests by serving selected ones of the documents 118 which form the application 106. One exemplary implementation of server 104 can be a conventional Web server. Alternatively, the server 104 can be an application server such as the WebSphere™ application server manufactured by International Business Machines Corporation of Armonk, N.Y.

Each help server 112A, 112B containing a help servlet can include one or more help files, classes, objects or generally, help resources, collectively referred to as "help files" 116A, 116B, in fixed storage 114A, 114B, respectively. Notably, the help files can be stored in fixed storage 114A, 114B in many ways. For example, the help files can be implemented as a collection of Java classes in an archive such as a JAR file or a JavaHelp™ HelpSet™. As another example, the help files also can be stored in one or more directories in a file system of the local environment of the server 112A, 112B. Finally, the help files can be implemented both as an archive and in a file system.

Each help servlet can respond to requests for context-sensitive help 120 by locating within fixed storage particular ones of the help files 116A, 116B. Once the pertinent help files have been located, the help servlet can respond to the requesting clients 102 with a response 122 containing the pertinent help files. In particular, as one skilled in the art will recognize, the response 122 can include markup specifying the presentation and/or personalization of the pertinent help files. In the case of the personalization of the pertinent help files, the help files can contain personalized data such as user names, local data or configuration information.

Figure 2:
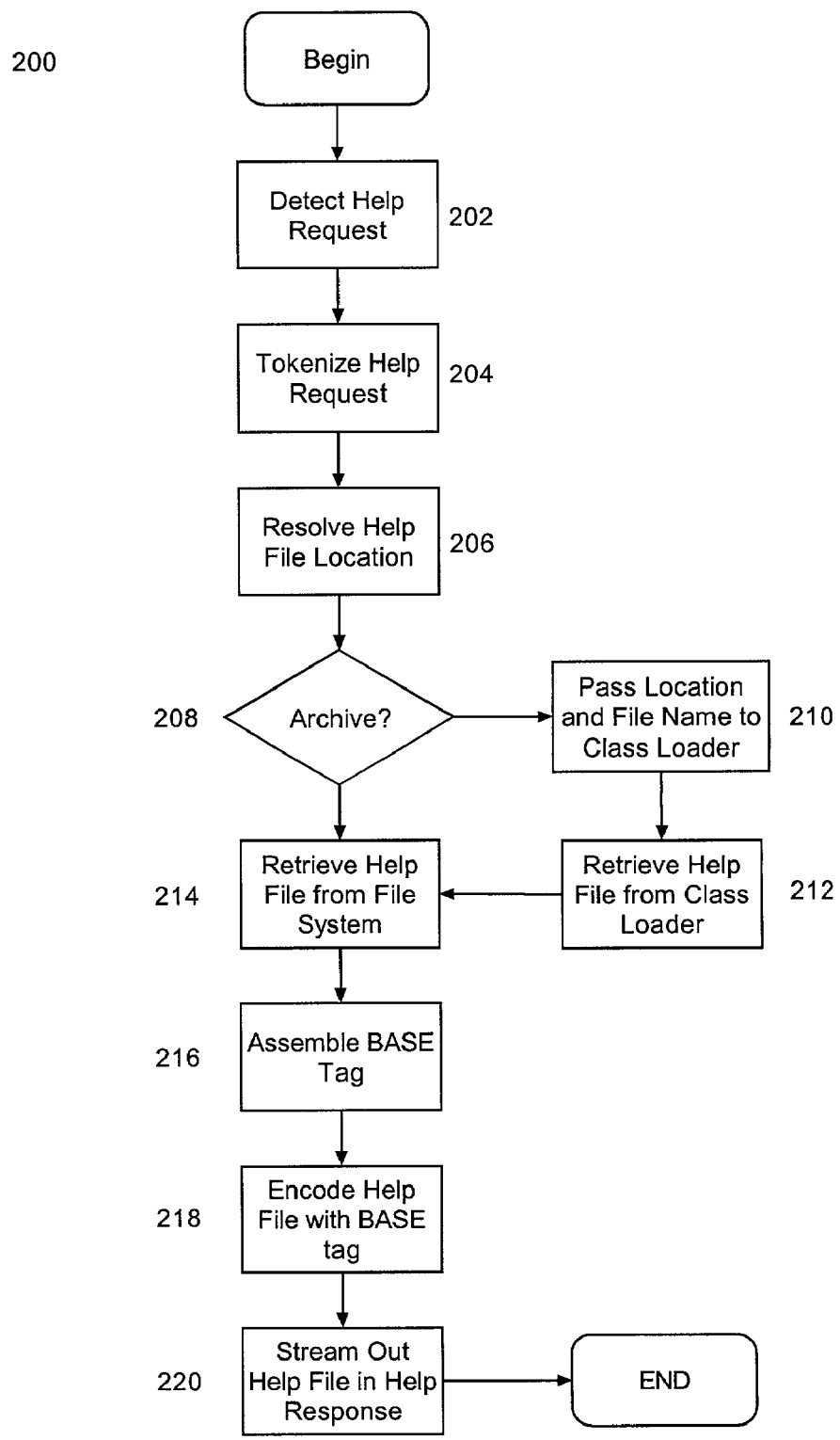
FIG. 2 is a flow chart illustrating a process for handling a help request in the help system of FIG. 1.

FIG. 2 is a flow chart illustrating a process 200 for handling a help request in the help system of FIG. 1. The process can begin in step 202 in which the help servlet receives a request for context-sensitive help. In step 204, the help servlet can tokenize the request in order to identify therein a base address and help file name. Importantly, the base address specifying the location of the help file further can be encoded in the help files at run-time. In step 206, the help servlet can resolve the location of the requested help file in fixed storage based upon the base address and help file name. Importantly, the help file can be any resource, including not only a text document, but also a resource such as those which can be included in a Java archive.

In step 208, it can be determined whether the help file resides in a particular location in a file system, or whether the help file is included as part of an archive such as a JAR file. If the help file merely resides in a location in a file system, in step 214 the help file can be conventionally retrieved as in the case of any other file stored in a conventional file system. Otherwise, if the help file resides in an archive, in step 210 the base address and help file name can be passed to a class loader or other such equivalent object. The class loader, in turn, can locate and extract the requested help file from the archive as would be the case in any conventional class loader such as the Java Class Loader. Subsequently, in step 212, the extracted help file can be retrieved from the class loader.

In step 216, a base tag can be assembled to include the network address of the help servlet and a base path to the help files in fixed storage. In this way, all relative requests for help files can be resolved by the specified help servlet in reference to the base address. In step 218, the requested help file can be formatted for presentation in a browser and the base tag can be prepended thereto. Once the help file has been encoded with the base tag, in step 220 the encoded help file can be streamed-out to the requesting client.

In consequence, unlike prior art help systems, in the help system of the present invention, the help servlet can resolve references to all archived help resources without extracting the resources from an archive, or finding and repairing all individual references to relative resources. Additionally, as the help servlet can capitalize on the capabilities of a class loader, the help servlet can process any resource which can be located by the class loader, regardless of whether those resources are in an archive or merely stored in a file system.

Figure 3A:
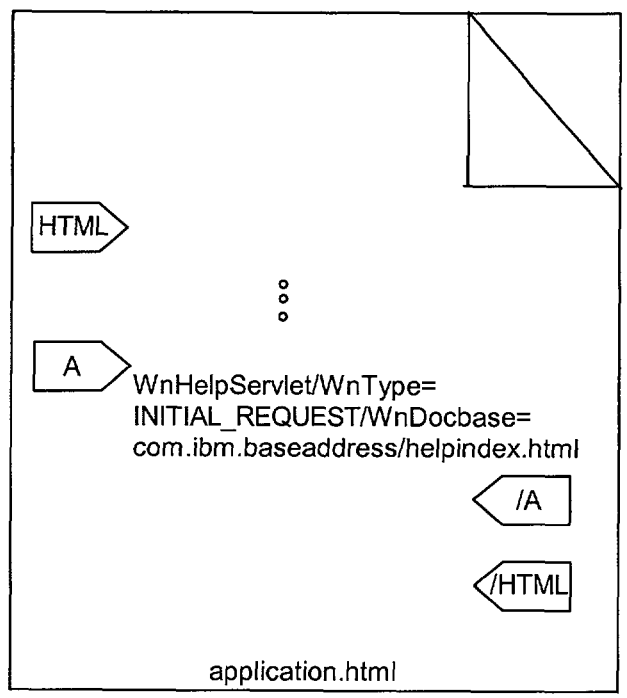
FIG. 3A is a pictorial illustration of a markup document which has been configured with a help link to the help system of FIG. 1; and, FIG. 3B is a pictorial illustration of a help file which has been encoded with a base tag and a relative help link in accordance with the inventive arrangements.

FIG. 3A is a pictorial illustration of an exemplary markup document ("application.html") which has been configured with a help link to the help system of FIG. 1. To simulate context-sensitive help in a markup environment such as HTML 3.2, a help icon can be placed adjacent to any field requiring context-sensitive help. The help icon can be encoded in HTML, for instance, using the anchor tag as shown in FIG. 3A. The anchor can include the network address of the help servlet so that when an end-user selects the help icon, a request for help can be formulated and transmitted to the help servlet.

Notably, the network address can be in the form of a uniform resource locator (URL). The URL can be formed based upon the following algorithm. First, a base path can be obtained for the help file, preferably the root help file, e.g. helpindex.html. As shown in FIG. 3A, the base path can be, for example, "com.ibm.baseaddress". Also, the file name of the help file can be obtained, for example "helpindex.html". Finally, each of the base path and file name can be combined with information denoting the type of help request to form the help servlet URL. As shown in FIG. 3A, an exemplary help servlet URL can include, "WnHelpServlet/WnType=INITIAL_REQUEST/WnDocbase= com.ibm.baseaddress/helpindex.html".

Figure 3B:
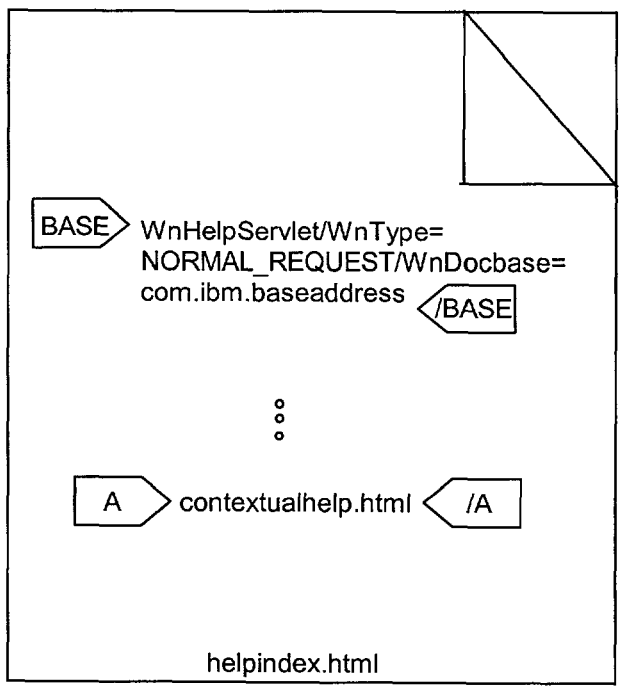

The application page containing the help link with the encoded URL can be streamed-out to requesting clients as usual. When an end-user selects a help icon having associated therewith the encoded URL, the request for help can be directed to the help servlet at the address specified in the help servlet URL, e.g. "com.ibm.baseaddress". The help servlet can tokenize the URL, extracting the type of request, the base path and help file name. This information can be used by the help servlet to locate, retrieve and prepend the base tag to the requested help resource in accordance with the process illustrated in FIG. 2. FIG. 3B is a pictorial illustration of a help file which has been encoded with a base tag and a relative help link in accordance with the inventive arrangements.

Importantly, in a preferred embodiment of the present invention, the help resources can be located in an archive upon deployment of an associated application. Notwithstanding, in other environments, the help resources can be located in a directory structure in a conventional file system. This particularly can be the case during the development phase of the application. In any event, in accordance with the inventive arrangements, the help servlet can serve help files, as well as any resource referenced in the help files, to requesting clients without always extracting the help files from a help file archive.

The present invention can be realized in hardware, software, or a combination of hardware and software. The help system of the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A cross-environment help system for supporting a network distributable application comprising a collection of network distributable documents, the documents comprising markup, the help system comprising:
   fixed storage containing one of a plurality of context-specific help files and a help file archive comprising a plurality of context-specific help files;
   a base address and at least one help link, both embedded in the markup in selected ones of the network distributable documents, said help link specifying a relative address of one of said context-specific help files, said base address specifying a base location in said fixed storage from which said relative address can be resolved; and,
   a help servlet configured both to resolve a location of a selected help file from said base and relative addresses, and also to retrieve said selected help file at said resolved location from among said one of said plurality of context-specific files and said help file archive.

2. The cross-environment help system of claim 1, further comprising:
   a base path and servlet address, both embedded in said base address, wherein said help servlet can be accessed through said base path at said servlet address.

3. The cross-environment help system of claim 1, further comprising:
   a document encoder configured to append said base address to selected ones of the help files.

4. The cross-environment help system of claim 1, wherein said help files comprise help objects, each said help object comprising at least one instance of at least one help class.

5. A method for providing context-sensitive help across variable environments, the method comprising:
   in one of the variable environments, tokenizing a received network request for help, said tokenization producing a contextually pertinent help file name and a base address of a corresponding help file;
   locating said corresponding help file in a fixed storage location referenced by associating said help file name with said base address;
   encoding said located help file with said base address
   transmitting said encoded help file to a requesting client;
   wherein said locating comprises of providing said help file name and base address to a class loader in the variable environment, said class loader searching said fixed storage location for said corresponding help file; and,
   if said class loader locates said corresponding help file in a help file archive, extracting said corresponding help file from said archive.

6. The method of claim 5, further comprising the steps of:
   encoding each help file in said fixed storage with said base address.

7. A machine readable storage having stored thereon a computer program for providing context-sensitive help across variable environments, the computer program comprising a routine set of instructions for causing the machine to perform the steps of:
   in one of the variable environments, tokenizing a received network request for help, said tokenization producing a contextually pertinent help file name and a base address of a corresponding help file;
   locating said corresponding help file in a fixed storage location referenced by associating said help file name with said base address;
   encoding said located help file with said base address;
   transmitting said encoded help file to a requesting client
   wherein said locating comprises of providing said help file name and base address to a class loader in the variable environment, said class loader searching said fixed storage location for said corresponding help file; and,
   if said class loader locates said corresponding help file in a help file archive, extracting said corresponding help file from said archive.

8. The machine readable storage of claim 7, further comprising the steps of:
   encoding each help file in said fixed storage with said base address.

* * * * *